United States Patent [19]
Collier et al.

[11] Patent Number: 5,205,877
[45] Date of Patent: Apr. 27, 1993

[54] PROCESS FOR MAKING WIRE MESH SCREENS

[75] Inventors: John D. Collier, Amherst; James W. Scheeler, North Tonawanda, both of N.Y.

[73] Assignee: Bison Steel, Inc., Depew, N.Y.

[21] Appl. No.: 676,811

[22] Filed: Mar. 28, 1991

[51] Int. Cl.$^5$ ............................................. B23K 11/32
[52] U.S. Cl. ..................................... 148/526; 219/56; 219/58; 148/507
[58] Field of Search ...................... 148/127, 134, 12 R, 148/12 B; 219/156, 56, 57, 58

[56] References Cited

U.S. PATENT DOCUMENTS

| | | | |
|---|---|---|---|
| 3,573,418 | 4/1971 | Amakasu et al. | 219/58 |
| 4,032,368 | 6/1977 | Grange | 148/134 |
| 4,375,995 | 3/1983 | Sugino et al. | 148/12 R |
| 4,686,342 | 8/1987 | Collier et al. | 219/58 |
| 4,895,605 | 1/1990 | Ackert et al. | 148/12 B |

FOREIGN PATENT DOCUMENTS

| | | | |
|---|---|---|---|
| 53-108025 | 9/1978 | Japan | 148/127 |
| 56-112416 | 9/1981 | Japan | 148/134 |

Primary Examiner—Geoffrey S. Evans
Attorney, Agent, or Firm—Hodgson, Russ, Andrews, Woods & Goodyear

[57] ABSTRACT

Making wire screens using high carbon steel wire. A first array of wires are placed in a longitudinal configuration and a second array of wires are placed transversely of said first array. The junctions where the wires meet are heated to a temperature of from about 700° F. to about 1000° F. for a time sufficient to disperse heat to adjacent wire areas but insufficient to cause wire fusion. A current is then applied to these junctions sufficient to cause fusion or welding of the junctions. Subsequently, a post weld heat of at least 1575° F. is applied to the wires sufficient to form pearlite in substantial amounts.

18 Claims, 1 Drawing Sheet

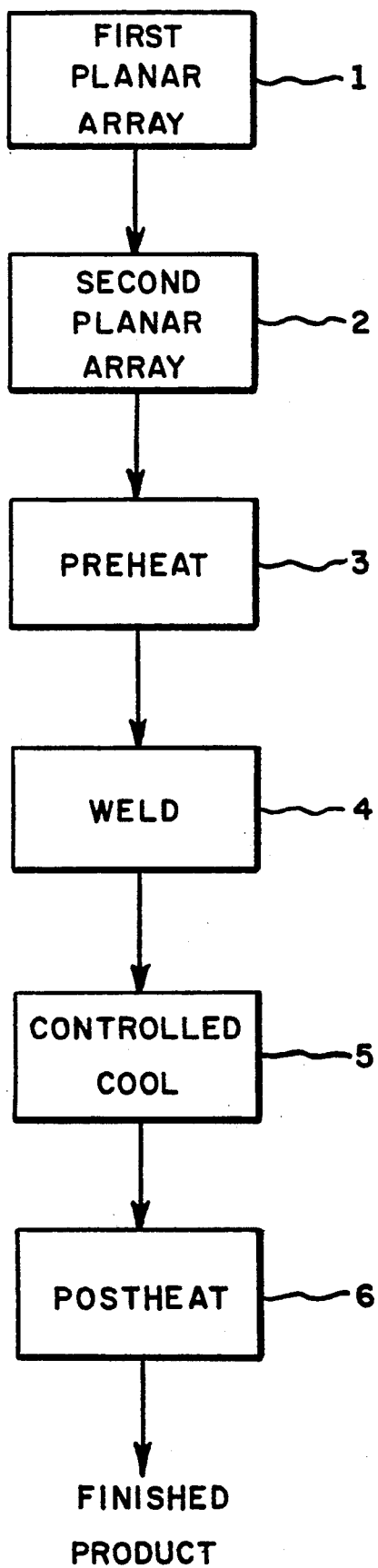

PROCESS FOR MAKING WIRE MESH SCREENS

This invention relates to a process for manufacturing wire mesh screens and, more particularly, to a process for making non-woven screens having a high carbon content.

BACKGROUND OF THE INVENTION

Various processes have been known for the production of wire mesh screens. The use of strong high carbon steel mesh screens is particularly desirable for use in mining, quarry, sand and gravel, steel milling, coal coking and slag operations. Also, the use of such mesh screens is important for security barriers in high security areas. High carbon steel screens or mesh are generally made by processes involving weaving pre-crimped wires into a mesh by the use of a loom or the like. The weaving machines and techniques used are substantially the same as in textile machine usage. This method, however, is not particularly suitable in making steel mesh screens using wires with a substantially large diameter. The use of weaving methods therefore has been utilized generally in the manufacture of steel screens with wires of relatively small diameters. When it was necessary to construct wire mesh screens from wires having large diameters (over about 0.03 inches) usually this was accomplished manually.

In earlier filed U.S. Pat. No. 4,686,342 (Collier et al) which is commonly owned with the present invention, a method for making steel wire mesh screens from high carbon steel wires was disclosed and claimed. Collier et al disclosed a process whereby an oil quench was required at the conclusion of the process. In addition, Collier et at required the formation only of martensite in the welded mesh by an elevated heating post weld step. During continued development of this process which resulted in the present invention, it was found that not only was the time consuming oil quenching not required, but also the formation of martensite by itself was not optimum.

There are several processes relating to steel wire structures such as those disclosed in U.S. Pat. Nos. 3,539,752; 3,884,730 and 3,648,006.

The process of U.S. Pat. No. 3,648,006 differs substantially from the present invention in that a single wire is heated by direct current heating between two electrodes separate and distinct from the welding electrodes. Even separate transformers are used, Th for heating and Tw for welding. The principle of the process is similar to Ernst (U.S. Pat. No. 3,539,752) in that significant pre-heating will leave some residual heat after welding which will slow the rate of cooling. However, U.S. Pat. No. 3,648,006 only heats one of the wires to be welded. It is assumed that the other wire to be of similar material and therefore would not derive much heat from a point contact with a pre-heated wire. It is foreseen that by pre-heating to 1,000° C. the wire to be bent and wrapped would be softened and thus the subsequent bending would require less force. This prior art patent also relates to welding circular wire cages for reinforcing unlike the present application which relates to welding flat sheets of wire mesh. This prior art patent describes a process for welding one wire, whereas the present invention covers a process for welding several wires simultaneously.

U.S. Pat. No. 3,884,730 relates to surface hardening by induction or flame hardening of machine elements, such as injection molding lead screws, which is quite unrelated to welded wire mesh screens. The U.S. Pat. No. 3,884,730 also relates to treatment of expensive tool steels, having chromium, vanadium, molybdenum and tungsten in significant amounts whereas these elements are not present, other than as trace elements, in the grades of steel covered by the present application.

The process described in the Ernst U.S. Pat. No. 3,539,752 does not encourage the presence of martensite in the final weld nugget, but rather is designed to eliminate martensite. The Ernst patent does not refer to high carbon steel either directly or by interference. The Ernst patent does not refer to martensite or pearlite or any other austenite products. The Ernst patent does not refer to the size of the bars being welded. The Ernst process differs in method of applying pre-heat and post-heat to the welded junction. Ernst uses hot gasses while applicants use controlled electric current passage. The Ernst patent heats slowly while applicants heat fast (15 cycles is typical for our process) and in a "gradual" cooling is the object whereas in the present invention a defined, controlled rate is used which is dictated by the appropriate transformation curve for the steel being welded. The Ernst process is not practical in that the hot air or gasses tend to heat adjacent machinery so that these items have to be either shielded or cooled. Applicants are not familiar with any mesh welding machine equipped with the process described by Ernst, i.e., after 25 years it is still not practical or acceptable or does not seem to have advantages.

A major reason why none of the above-discussed prior art deals with welding of high carbon steel is that in prior art attempts the wire has become weak and brittle in the vicinity of the weld. Thus, the processes involved with welding of wire have been limited to wires containing low carbon steel.

Welding operations usually necessitate the local application of heat, the amount of heat applied and the temperature locally attained depend upon the type of weld to be made. Thus, the temperature at the heated area may be only sufficient to render the meeting surfaces of the members semi-plastic as in forge welding or sufficient to melt the meeting surfaces thoroughly as in full fusion welding. Although in welding operations the heat is usually applied only to or adjacent to the surfaces to be united, metal adjacent to and remote from the heated surfaces is also heated by conduction from the directly heated surfaces. Such heating being uneven tends to warp and distort the welded article or, in some cases, causes brittleness.

The problem of shrinking and warping is particularly important in the fabrication of welded structures from large sheets and plates such as those which are now used in the construction of railway box cars, gondola cars and other rolling stock. As the metal sheets and plates used in this particular field are relatively thin, they are peculiarly susceptible to warping during welding as the small mass of metal is not strong enough to resist stresses developed by the expansion and contraction incidental to the localized application of heat to the metal plate or metal object.

As the grain size of the steel is influenced by the time interval during which the temperature is maintained in or above the upper critical range, it is desirable to cool the metal rapidly to below the upper critical range as soon as possible after it has been welded. In cross wire welding similar to projection welding, a large current is passed through the two surfaces which are to be welded. As the time during which this current passes is brief, generally less than a second, this gives rise to severe temperature gradients in the heat affected zone. The effects of these temperature gradients on steel having a carbon content of 0.5% and greater, are deleterious.

In U.S. Pat. No. 4,686,342 a process is claimed whereby high carbon steel wire mesh is welded, heated after welding, by induction or a similar process and subsequently quenched by oil or an equivalent quenching medium. This was found in practice to be unfeasible due to the mesh being fed through an oil quench curtain in an intermittent manner, in increments of a distance equal to the opening of the said mesh plus a wire diameter. In this situation the mesh would be stationary for a period of several seconds, typically five seconds. This form of index feeding hot mesh through a quenching curtain causes a severe temperature gradient to occur and varying cooling rates and thus it was deemed to be impractical. Therefore, it was decided by the applicants to utilize the residual heat in the heat-affected zone and control the cooling rate to achieve a majority of pearlite, 50% minimum (based on total volume) in the finished weld and adjacent steel. This dominant amount of pearlite would result in an "annealed" heat-affected zone. The mechanics of pearlite and advantages of its presence are fully discussed herein.

The manganese content of the steel being welded is significant. Increased manganese content moves the transformation diagram which increases the time required for successful welding. It has been found that steels with a low manganese content, typically less than 0.8%, generally are easier to weld.

The relationship of temperature and time on the transformation of steel depends on the chemical constituent of the steel and the transformation curves or S curves are readily available for known alloys.

To achieve small grain size, that is, one with many boundaries to facilitate the formation of pearlite which forms along the grain boundaries, it is necessary to understand the changing relationships which occur throughout the weld cycle.

It is conceivable that given the right circumstances of market and some technology being developed, very high speed welding of high carbon wires into light, that is wires under 0.032" in diameter, could be an attractive reality.

This particular segment of the industry is currently served by weaving wires into mesh, having various weaves, simple, twill, arched, etc. It is possible with light wires to weave using automatic methods, similar in style to the textile industry; one of the foremost of these is the Emil Jaeger Co., Germany.

With respect to welding, the general approach foreseen would be to use a seam or roller type of welding system. Roller welding machines currently in use in the fabrication of low carbon wire assemblies can achieve speeds up to 600 feet per minute; typical speeds for automatic weaving machines would be 1-24 inches/minute.

In order to adapt roller welding technology to high carbon steel wire mesh, it is foreseen that welding speeds would be reduced to satisfy the metallurgy, that is the time for transformations to occur. It should, however, be possible to achieve speeds of 100 feet per minute. One of the mechanical problems to be solved would be to feed sufficient cross wire. For example, a 40 mesh would require 40 wires per inch × 12 per foot × 100 feet per minute = 48000 wires/minute. Each wire would need to be straight and positioned correctly for welding.

There is considerable global market for fine wire mesh and to be able to produce 50 to 100 times faster than at present could be justification to proceed with the design of the present invention.

BRIEF DESCRIPTION OF THE DRAWING

The single FIGURE of the drawing is a flow chart illustrating the process according to the present invention.

SUMMARY OF THE INVENTION AND PREFERRED EMBODIMENTS

It is therefore an object of this invention to provide a process for making high carbon steel mesh screens devoid of the above-noted disadvantages.

Another object of this invention is to provide an improved welding process used in the manufacturing of mesh screens from high carbon steel wires.

Another still further object of this invention is to provide an efficient and reliable automatic method for the production of steel wire screens wherein the diameter of the wire is substantially larger than heretofore possible in prior art automatic weaving methods.

Still another object of this invention is to provide a novel method for the production of steel wire products and mesh screens that are stronger and have a substantially longer life than previously attainable using prior art welding methods with low carbon steel.

Yet another object of this invention is to provide a method wherein a novel welding process is used to produce welded high carbon steel wire screens having pearlite dispersed therein.

Still yet another object of this invention is to provide a novel process for the production of high carbon steel wire screens that is automatic and uses a welding process with steel wires having a higher carbon content and greater diameter than heretofore used.

The foregoing objects and others are accomplished by this invention generally speaking by providing a novel process for producing high carbon steel wire products including wire screens. In the present process a first array of wires 1 is provided in a longitudinal configuration and a second array of wires 2 is provided in a transverse configuration extending transversely of said first array of wires and forming several wire joints thereby. Throughout the specification and claims the terms "longitudinal configuration" and "transverse configuration" are intended to include a first array of wires and a second array of wires that cross in any suitable fashion or at any suitable angle. These steel wires have a carbon content of at least 0.5% and are welded into a screen by first heating 3 the weld joint formed with a pulse of current insufficient to weld. This heat elevates the temperature in the vicinity of the weld and allows the heat to disperse into the adjacent steel. Then a pulse of current sufficient to weld is applied 4 and a current is continued to effectuate a temperature of at least about 1575° F. Subsequently, after welding, the current is dropped 5 to allow the weld nugget to coalesce, but at a controlled rate to maintain the temperature in the heat affected zone above the upper critical limit and subsequent to that, the current flow is lowered 6 until the heat affected zone, which is still under pressure of the weld contacts, experiences a temperature below the lower critical temperature and substantial amounts of pearlite and martensite are formed. The welded connection is then released from the weld contacts and allowed to air cool to ambient temperature. It is critical to this invention that substantial amounts of pearlite be formed in an amount sufficient to prevent substantial cracking of the welded junction. This amount of pearlite can be defined as any amount that will prevent substantial cracking of the welded junction, usually 50% to 100% amounts by volume of the parent metal.

The times and values of the current used vary with the diameter of wire being welded.

After the post heat period has elapsed and the wire cooled, the resulting structure is a strong, hard high carbon steel wire mesh with securely welded interface. The heat affected zone will be composed mostly of pearlite thus giving the effect of an "annealed" weld, and avoid a hard brittle weld nugget with the attendant incidence of cracking along its boundaries. In the present invention, it is desirable to use steels such as AISI 1055, 1060 and several other carbon steel alloys, if suitable, could be welded with variations to the process. The steel wire should be in the as drawn condition with a hardness value that will permit its adequate performance as a quarry screen, the hardness value between the wire does not change as a result of this welding.

An advantage of this process is that the wire in the as drawn condition is hard from work hardening during the drawing process and thus obviates the need for using expensive oil tempered wire.

The weld penetration is designed to be a strength feature in that the wire adjacent to the weld should bend under a given load before the weld fails. The weld penetration is therefore a function of wire diameter and space between the wires. It was found that in the worst case 9.8% penetration equalled in shear strength the bending or tensile strength of the wire. This being so, we have standardized all the welds at at least 15% penetration. This has been found to give the best field results when dealing with uneven and irregular loads experienced in the field. For example, with 15% penetration, two wires 0.375" diameter would have an overall dimension of 0.75" before welding, after a 15% penetration weld the overall dimension would be $0.750 \times 0.85 = 0.6375"$.

Any suitable high carbon steel or steel alloy may be used in the process of this invention. Steels are interstitial alloys of iron and small amounts of carbon and other elements. High carbon steel is generally defined as steel or steel alloys having 0.5% to 1.5% carbon. Steel below this amount, usually 0.10% to 0.3% is referred to as low carbon steel. Steel having carbon contents between those two forms is usually referred to with reference to the percent carbon and not as "high" or "low" carbon steel.

Any suitable wire diameter may be used to form the screen of this invention. Typical wire diameters that can be utilized are 0.032" to 1.00". Typically, suitable wires are described in detail in Catalog 110, "Wire Cloth and Wire Screens", published by Greening Donald Co., Ltd., of Ontario, Canada and Catalog No. 13, Buffalo Wire Works Co., of Buffalo, N.Y. The range of wire diameter and wire openings utilizable with the process of this invention is significantly greater than heretofore possible with woven wire.

When any high carbon steel is heated above a temperature of about 1300° F. (depending on the exact chemical composition of the steel being used) it will change its crystal structure. Above this temperature the predominant crystal structure is known as austenite. On cooling, however, austenite decays into various daughter products. Each product has a different microstructure and a different set of physical properties accordingly. It has been found that the resultant microstructure and hence the final properties of the steel concerned, depends primarily on two things:

1. The chemical composition of the steel
2. The cooling rate, particularly in the range from 1450° F. to 950° F.

These metallurgical changes are best shown on a Transformation Diagram well known in the art. Starting from the austenite phase (above 1333° F.) the steel undergoes many transformations as it cools to room temperature. If the cooling rates are slow enough the steel assumes the relatively soft and ductile mixtures of ferrite, pearlite and bainite but rapid cooling rates produce the martensite crystal structure. Martensite, particularly in high carbon steels, is hard and brittle and is prone to crack formation. Therefore, it is common practice to "temper" steels by heat treating them in the range 575° F. to 1100° F. and soften any martensite that may have formed during cooling.

In this invention a heat treatment is used which reduces the brittle nature of the martensite structure.

In brief, the carbon in the martensite is redistributed by holding the steel at an elevated temperature = 1575° F. to 1625° F. for a period of several seconds. This allows the martensite to change from a brittle lattice structure to a tougher modular form, with the tempered martensite spread not only throughout the weld nugget and heat affected zone but also into the surrounding base metal.

This enables the final steel to withstand far greater stress concentrations than untreated martensite but still maintain most of the martensite hardness. This provides heavy duty high carbon steel screens with greatly enhanced working lives.

It is all very well to study the relevant Transformation Diagram and to select from it the desired cooling path and hence final steel microstructure. In practice, however, the situation is very complex and the decomposition of austenite into its various daughter products depends on a number of variables such as:

1. The diameter of the wire
2. The geometry of the weld
3. The grade of steel used
4. Pre-heat practice
5. Heat input during welding
6. Post-weld heat treatment
7. Forge pressure
8. Austenite grain size
9. Cycle time Traditionally, the operators would set the three parameters: Heat Input, Time of Cycle and Forge Pressure which make up the weld cycle. These settings would be based mainly on past experience but when any of the above parameters change one would be unsure of the final state of the weld and, therefore, would have to proceed on a trial and error basis.

These problems have been overcome by using a computer algorithm (program) to simulate the kinetics of the decomposition of austenite in the weld nugget and heat affected zone.

Much simplified, the algorithm is split into three parts:

1. Initialization of parameters
2. Modelling Heat Transfers

3. Austenite Daughter Products

Given the original weld parameters the algorithm first calculates the Transformation Temperatures of the wire—these are the transformations between the various crystal structures possible and depend on the exact chemical composition of the steel being used. For example, the Pearlite Start Temperature (Ps) in degrees kelvin is calculated using the following formula:

$$P(s) = 995.8 - 13.89Mn + 22.22Si - 14.44Ni + 23.33Cr$$

and the Bainite Start Temperature (Bs) is:

$$Bs = 929.6 - 58.3C - 35.4Mn - 75.5Si - 15Ni - 34Cr - 41Mo$$

Where
Mn = % manganese in steel
Si = % silicon in steel
Ni = % nickel in steel, etc.

As well as calculating the transformation temperatures between crystal structures, the algorithm calculates the specific heat capacity and solid-liquid transformation temperature of the steel.

Note that the algorithm can deal with all grades of steel. All the operator has to do is enter in the correct chemical composition (i.e. % Carbon % Manganese, etc.) for each steel being used.

The algorithm then uses a finite-difference model which divides the two crossed wires into small elements and simulates the flow of energy between each element. Thus, an energy balance for a given element at a given time interval is as follows:

$$Qin - Qout + Qgen = pVCp\, dT/dt$$

Qin = Energy entering element
Qout = Energy leaving element
Qgen = Energy generated within element from:
 1. Current passing
 2. Change of structure, i.e. austenite-martensite, liquid-solid
p = Density of material
V = Volume of element
Cp = Specific Heat Capacity
T = Temperature
t = Time Where the rate of heat entering or leaving an element is given by:

$$Qin/out = KA\, dT/dx$$

A = Area of element
K = Thermal conductivity
X = Distance

Using this model we can accurately predict the temperatures and cooling rates of points throughout the weld as they undergo the critical cooling process.

As well as predicting the temperature of the nodes in the weld, the algorithm calculates the fractions of austenite daughter products present at any one time.

The decomposition of austenite into martensite, bainite, pearlite, etc. is modelled using an Avrami type differential equation of the general form:

$$dx/dt = D\,(G,T,x)\, x^m\, (1-x)^p$$

dx/dt = The rate of product formation
D = Rate coefficient
T = Temperature
G = Grain size
m and p = Constants This is the general form with a similar equation used for the formation of each daughter product. Take martensite, for example. Once the temperature has reached the martensite start temperature (previously calculated) the growth rate of martensite is governed by the equation:

$$dx/dt = 2\frac{\Delta T^{(G-1)/2} \cdot x^{2(1-x)/3} \cdot (1-x)^{2x/3}}{59.6Mn + 1.45Ni + 67.7Cr + 24.4Mo}$$

Where ΔT = Degree of Undercooling

This calculation is performed in incremental time steps and the amount of martensite which forms during each step is added to the previous amount of martensite in the element.

Similar equations are used for the formation of all other daughter products, e.g. pearlite, bainite and ferrite, as the austenite decomposes. Hence the exact physical microstructure of the weld nugget can be monitored and in this way the physical properties of all sizes and of all grades of steel being welded can be predicted.

Cooling of these grades of high carbon steel is normally done by oil or alklyd in solution. This will give a less severe cooling rate than water and will reduce the risks of cracking. The present process, however, uses low current passage to lower the temperature in the heat affected zone below the lower critical range and thereafter air cool.

Accordingly, there exists today a need for an automatic, effective and an economical welding process for manufacturing wire mesh screens having wider ranges of diameters and composed of high carbon steel.

Pearlite, formed during the properly controlled post weld heat cooling period, is the softest of all the daughter products of austenite decomposition. Soft is a relative expression but it typically has a softness or hardness closely matching that of the steel adjacent to the weld, or heat affected zone.

If high carbon steel were resistance welded without a post weld heat period, the resulting weld nugget would solidify very fast as a result of chilling by adjacent steel and the water cooled copper weld contacts. This would give a hard weld nugget, typical hardness RC 65, surrounded by unaffected steel, hardness RC 30.

This chilling also results in weld nugget and heat affected zone contraction which can produce boundary separation or microscopic cracking. Cracking does not occur during the pre weld or weld period where the heat affected zone is heating up and expanding into the surrounding metal.

When any steel shape is subjected to load, elastic deformation occurs. When the hard steel nugget is surrounded by relatively soft steel and experiences this deformation, and its associated forces, the nugget does not deflect as greatly as the softer surrounding steel. Therefore, the soft steel tries to deflect further than the hard steel in response to the load. This can cause tensile forces to occur at the boundary of the nugget and the surrounding steel causing in some cases separation or cracking to occur.

In a properly heat treated mesh, all the steel has a common condition and there are no boundaries for this tension to occur. So by post heat treating and by controlling the cooling and rate of transformation, it is important that considerable quantities of pearlite (at least 50% by volume of the parent metal) are formed thus ensuring that the heat affected zone and weld nugget have similar hardness to the parent metal.

It should be noted that hardness and strength, i.e., the ability to withstand load, have a direct relationship for steels in this category.

It should also be noted that the forces experienced by wire mesh in service are the greatest where the wires intersect, which is also where the weld occurs. To be more precise, the greatest forces occur in the individual wires at the intersection which is approximately the same position as the boundary between the weld nugget and the adjacent steel. This has the obvious detrimental effect of promoting crack growth to ultimate failure of the wire where severe pre-existing cooling cracks exist.

The following example further illustrates the present invention with reference to preferred materials and conditions.

A steel wire composed of AISI 1055 in the drawn condition is used in this example. The wire has a carbon content of 0.54% Mn of 0.69%, S of 0.008%, Si of 0.21% and P of 0.009%. The wire diameter is 0.375 inches. Several strands of the wire are laid perpendicular to each other in an electric resistance welding machine and a pulse of electric current applied at their intersections. This pulse is varied in amplitude and is maintained for 0.3 seconds which is sufficient to allow heat to disperse into the adjacent steel areas. It should be noted that throughout the preweld, weld and post-weld phases of this process, the wire intersections are squeezed between the weld contacts. The post weld current falls in magnitude to control the cooling rate in the weld and the heat-affected zone. The desired cooling rate is dictated by the transformation diagram for the particular steel, however, it is not possible to achieve this for every molecule in the heat-affected zone. Therefore, a computer model is used to determine the optimum rate for the steel grade, mesh configuration and final use of the mesh.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A process for making non-woven steel wire screens from high carbon steel wires which comprises providing steel wires having a carbon content of at least 0.5% by weight, providing a first planar array of said wires in a longitudinal configuration, providing a second planar array of said wires in a transverse configuration extending transversely of said first planar array, all of said wires having relatively large diameters, heating at least one junction where a longitudinal and a transverse wire cross to a temperature of from about 700° F. to about 1000° F. for a sufficient period of time to allow heat to disperse to adjacent wire areas but insufficient to cause wire fusion, applying a pulse of electrical current to said junction sufficient to cause fusion or welding of said junction and subsequently heating the resulting welded portion to a post weld temperature of from at least about 1575° F. to result in the formation of pearlite in substantial amounts by controlled cooling through the continuing controlled use of welding contacts or electrodes.

2. The process of claim 1 wherein said steel wires have a carbon content of about 0.5% to about 1.5%.

3. The process of claim 1 wherein said pearlite is formed in amounts sufficient to prevent any substantial cracking of a welded junction.

4. The process of claim 1 wherein substantial amounts of both pearlite and martensite are formed by controlled cooling and the continuous use of welding contacts or electrodes.

5. The process of claim 1 wherein at least one welded junction is cooled to ambient air temperature by a controlled declining post weld current in contact therewith.

6. The process of claim 1 wherein substantially concurrently with said fusion or welding of the junctions terminal edge portions of said screens are formed into tensioning hooks.

7. The process of claim 1 wherein the diameters of said wires are at least about 0.03 inches.

8. The process of claim 1 wherein said wires have a carbon content greater than about 0.5% and a manganese content not exceeding about 1.0%.

9. The process of claim 1 wherein said resulting welded portion is heated sufficiently to permit dispersion of both pearlite and martensite in a resulting wire mesh screen.

10. A welding process for making non-woven steel wire screens from high carbon steel wires which comprises placing a first array of longitudinally positioned wires in contact with a second array of transversely positioned wires extending transversely of said first planar array, all of said wires having at least 0.5% carbon content and having relatively large diameters, heating at least one junction of said wires at a location where they are in contact to a temperature of from about 700° F. to about 1000° F. for a sufficient period of time to allow heat to disperse to adjacent wire areas but insufficient to cause wire fusion, applying a pulse of electrical current to said junction sufficient to cause fusion or welding of said junction, and heating the resulting welded portion to a post weld temperature of from at least about 1575° F. to form thereby a dispersion of pearlite in a resulting wire mesh screen.

11. The process of claim 10 wherein said steel wires have a carbon content of about 0.5% to about 1.5%.

12. The process of claim 10 wherein said pearlite is formed in amounts sufficient to prevent any substantial cracking of a welded junction.

13. The process of claim 10 wherein substantial amounts of both pearlite and martensite are formed by controlled cooling and the continuous use of welding contacts or electrodes.

14. The process of claim 10 wherein at least one welded junction is cooled to ambient air temperature by a controlled declining post weld current in contact therewith.

15. The process of claim 10 wherein substantially concurrently with said fusion or welding of the junctions terminal edge portions of said screens are formed into tensioning hooks.

16. The process of claim 10 wherein the diameters of said wires are at least about 0.03 inches.

17. The process of claim 10 wherein said wires have a carbon content greater than about 0.5% and a manganese content not exceeding about 1.0%.

18. The process of claim 10 wherein said resulting welded portion is heated sufficiently to permit dispersion of both pearlite and martensite in a resulting wire mesh screen.

* * * * *